US007783567B1

(12) United States Patent
Klieman et al.

(10) Patent No.: US 7,783,567 B1
(45) Date of Patent: Aug. 24, 2010

(54) BILL PAYMENT MIGRATION

(75) Inventors: Michael S. Klieman, Belmont, CA (US); Patricia D. Armada, Los Altos, CA (US); Muhammet Serdar Akin, Santa Clara, CA (US); Julia Patterson, Santa Clara, CA (US); Charles Eric Destrempes, Los Altos, CA (US); Akim Maryanchik, Sunnyvale, CA (US); Lei Wang, Monte Sereno, CA (US); Keng H. Teh, Calgary (CA)

(73) Assignee: Intuit Inc., Mountain View, CA (US)

( * ) Notice: Subject to any disclaimer, the term of this patent is extended or adjusted under 35 U.S.C. 154(b) by 906 days.

(21) Appl. No.: 11/245,643

(22) Filed: Oct. 7, 2005

Related U.S. Application Data

(60) Provisional application No. 60/702,702, filed on Jul. 26, 2005.

(51) Int. Cl.
*G06Q 40/00* (2006.01)
(52) U.S. Cl. .............................. 705/40; 705/39; 705/35
(58) Field of Classification Search .................. 705/35, 705/36 R, 38, 39, 40
See application file for complete search history.

(56) References Cited

U.S. PATENT DOCUMENTS

| 5,873,072 | A  | * | 2/1999  | Kight et al. ............... 705/40 |
| 5,884,288 | A  | * | 3/1999  | Chang et al. .............. 705/40 |
| 6,026,364 | A  | * | 2/2000  | Whitworth ................ 705/36 R |
| 6,298,335 | B1 | * | 10/2001 | Bernstein ................... 705/40 |
| 6,339,638 | B1 | * | 1/2002  | Ohki et al. .............. 379/91.01 |
| 6,594,647 | B1 | * | 7/2003  | Randle et al. ............. 705/40 |
| 7,155,409 | B1 | * | 12/2006 | Stroh ........................ 705/37 |
| 2001/0029485 | A1 | * | 10/2001 | Brody et al. ............... 705/39 |
| 2003/0014327 | A1 | * | 1/2003  | Skantze ..................... 705/26 |
| 2005/0177499 | A1 | * | 8/2005  | Thomas ..................... 705/40 |
| 2006/0270386 | A1 | * | 11/2006 | Yu et al. ................... 455/406 |

OTHER PUBLICATIONS

Fraust, Bart "The stakeout: down payment on the future: eventual interstate expansion one object of capital infusion." Jul. 19, 1985 American Banker, v150, p. 1(2).*
Scheinberg, Michael "Are Partial Payments Worth The Trouble?" Jan./Feb. 1996 Secured Lender v52n1 pp. 24-26.*
Andolfatto et al "A simple model of money and banking" Third Quarter 2001Economic Review—Federal Reserve Bank of Cleveland v37n3 pp. 20-28.*

* cited by examiner

*Primary Examiner*—Kelly Campen
(74) *Attorney, Agent, or Firm*—Gunnison, McKay & Hodgson, L.L.P.; Philip J. McKay

(57) ABSTRACT

A method and system for migrating transactions, such as bill payment transactions, between payment modules and/or payment processors. Each payment object is set up with payment information input to a payment module and results in one or more transactions. During a selective migration, each transaction is treated separately, based on a state of the transaction. A transaction that has either not been yet submitted, or has been completed can be migrated directly, while a transaction that is in some state of processing is iteratively migrated as it completes processing.

7 Claims, 5 Drawing Sheets

BILL PAYMENT MIGRATION

CLAIM TO THE BENEFIT OF AN EARILER FILING DATE OF A PROVISIONAL APPLICATION

The present Patent Application claims the benefit of the earlier filing date of the provisional application entitled "BILL PAY MIGRATION", filed in the name of common inventors Michael Samuel Klieman, Patricia D. Armada, Muhammet Serdar Akin, Julia Patterson, Charles Eric Destrempes, Akim Maryanchik, Lei Wang and Keng H. Teh; Ser. No. 60/702,702; and filed on Jul. 26, 2005.

FIELD OF THE INVENTION

The present invention relates generally to software tools for data migration.

BACKGROUND

Paying bills is a time-consuming, and frequent process. The advent of application software for bill payment on the front-end, and of payment processing systems on the back-end, has automated the bill payment process. Generally, the bill payment software provides a user interface for entering account and payment information, and setting up periodic payment instructions. As a result, and in some cases without further user input, the payment software automatically submits the payment instructions to the payment processing system. In turn, the processing system submits payments via the Automated Clearing House, or ACH, network which provides interbank regulations and clearing of batched payments.

Although seamless to the user, the bill payment process typically requires coordination between the bill payment software and the payment processing system, over a period of time. More particularly, the bill payment software submits payment transactions to the payment processing system, either directly, or through an intermediary, such as the user's bank. The payment processing system draws funds (e.g., via the ACH) from a funding source for disbursement of funds to the payee (e.g., by check or electronic transfer). After the payment has been sent to the payee, a confirmation is sent from the payment processing system to the bill payment software.

One problem with maintaining bill payments that are seamless to a user occurs when changing from an existing payment processing service to a different one. Today, a user changing bill payment software faces the task of manually deleting and recreating payment information. Where there is a change in the payment processing system, either directly or by an intermediary, a user may lose information related to bill payments in progress. For this reason, a one time copy of payees and payment instructions from a first payment processing system to the second payment processing system is ineffectual.

SUMMARY

The present invention provides systems and methods for migrating transactions such as bill payment transactions, between payment modules and/or payment processors. Each payment object is set up with payment information input to a payment module and results in one or more transactions. During a selective migration, each transaction is treated separately, based on a state of the transaction. A transaction that has either not been yet submitted, or has been completed can be migrated directly, while a transaction that is in some state of processing is iteratively migrated as it completes processing. In this way, pending bill payments are completed at a source and then updated at a target.

As a result, a provider of a payment module can change between providers of payment processing without losing track of transactions in progress. The change is seamless and tracking is invisible to a user. Moreover, a user can change between providers of payment modules.

One skilled in the art will recognize that these Figures are merely examples of the operation of the invention according to one embodiment and that other configurations and modes of operation can be used without departing from the essential characteristics of the invention.

DETAILED DESCRIPTION

Systems and methods for migrating transactions, such as bill payment transactions, between payment modules and/or payment processors are described. In general, pending transactions of a payment object are selectively migrated from a source to a target upon completion of transactions. The phrase "payment object" generally refers to a representation of bill payments, or other electronic funds transfers, and includes payment information associated with an account that a user has set up for transactions. The payment information is used to configure bill payment transactions and can include, for example, a billing name, a billing address, a payee name, a payee address, a payee account number, an invoice, a payment date, a payment amount (e.g., exact amount, maximum amount, or minimum amount), a payment frequency, a payment history, a payment state, and other information related to bill payments. In response to the payment information, bill payments are electronically completed on a one time or recurring basis, or in other words, the payment object spawns transactions. Bill payments are an example transaction described herein, but other transactions such as payroll payments, debit transfers, and the like, can also be implemented according to this description. The payment state (or payment status) of a particular transaction can be, for example, future payment, pending payment, or completed payment as discussed below with respect to FIG. 5.

Figure 1:
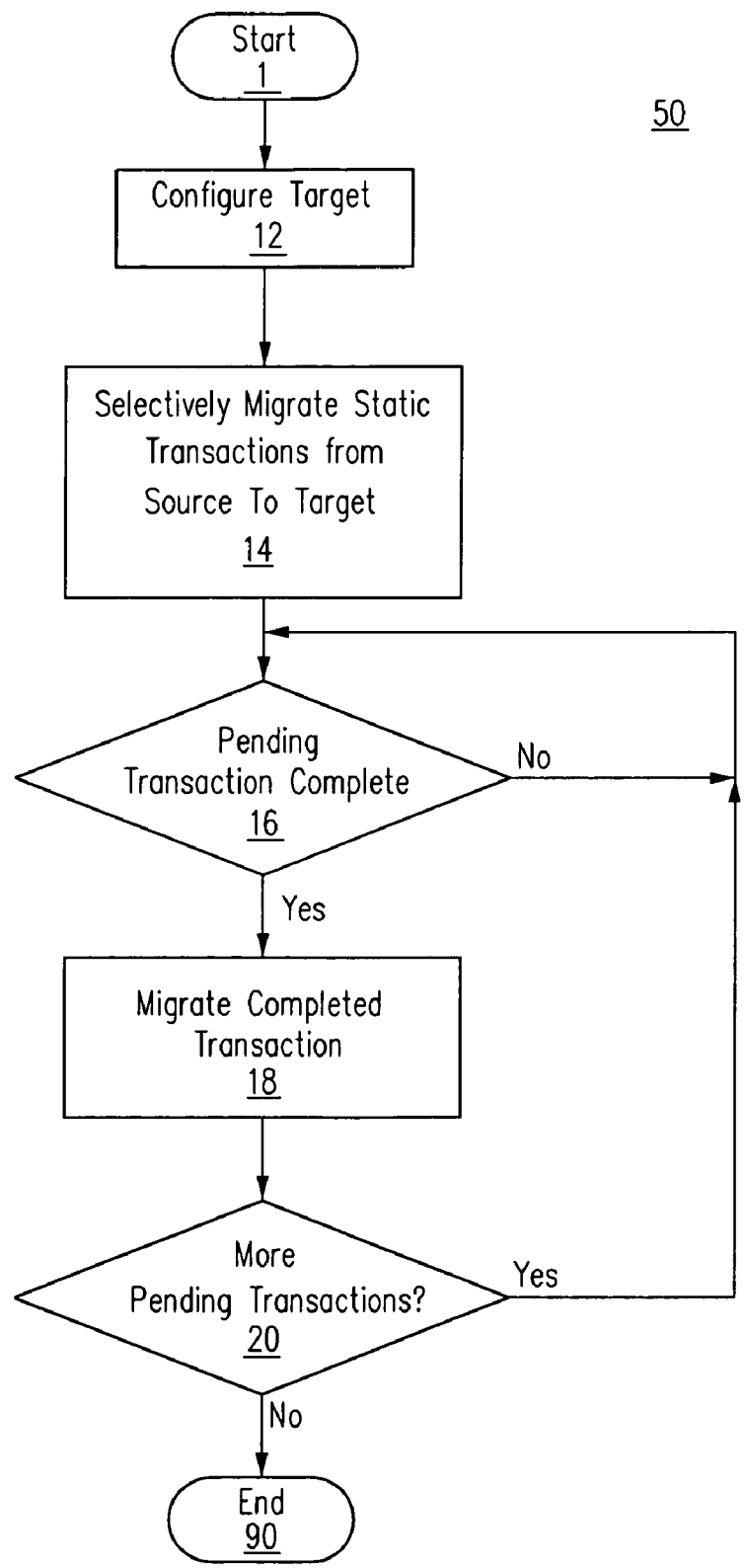
FIG. 1 is a flowchart illustrating a method for migrating bill payment transactions according to one embodiment of the present invention.

FIG. 1 is a flowchart illustrating a method 50 for migrating bill payment transactions according to one embodiment of the present invention. To initiate migration, a target is configured 12. Accordingly, in one embodiment, connection information for a new payment processing system can be supplied to an existing payment module. Connections can occur through a data network, telephone network, or other communications medium. The connection information can include an IP address or other network address, a telephone number, a login or other authentication information, and other information needed to facilitate communication of transactions. In another embodiment, connection information for an existing payment processing system can be supplied to a new payment module.

Next, static transactions are selectively migrated from the source to the target 14 as discussed below with respect to FIG. 2. Static transactions are scheduled to occur in the future or already completed, and thus, can be immediately migrated. Migration of a completed transaction is optional and copies information for logging or inclusion in a history. The payment history on the target can be updated to include the completed transaction, and conveyed to a user through a user interface. Migration of a future transaction involves cancellation at the source and configuration at the target using the connection information. The future transactions can thus be initiated directly from the target where a confirmation can also be received.

On the other hand, pending transactions have been dispatched based on connection information from the source (e.g., serial number or other identification) and a corresponding confirmation can be directed back to the source of dispatch. The pending transactions remain at the source in order to match up with the confirmation. The pending transactions that are not migrated in the first pass are monitored to detect completion 16. In one embodiment, a list of pending transactions can be maintained by the target and corresponding states are tracked. Once a confirmation is received, the completed transaction can be migrated 18 by replicating confirmation information to the target from the source.

The migration continues until there are no more pending transactions 20. At this point, a user account can be deactivated.

Figure 2:
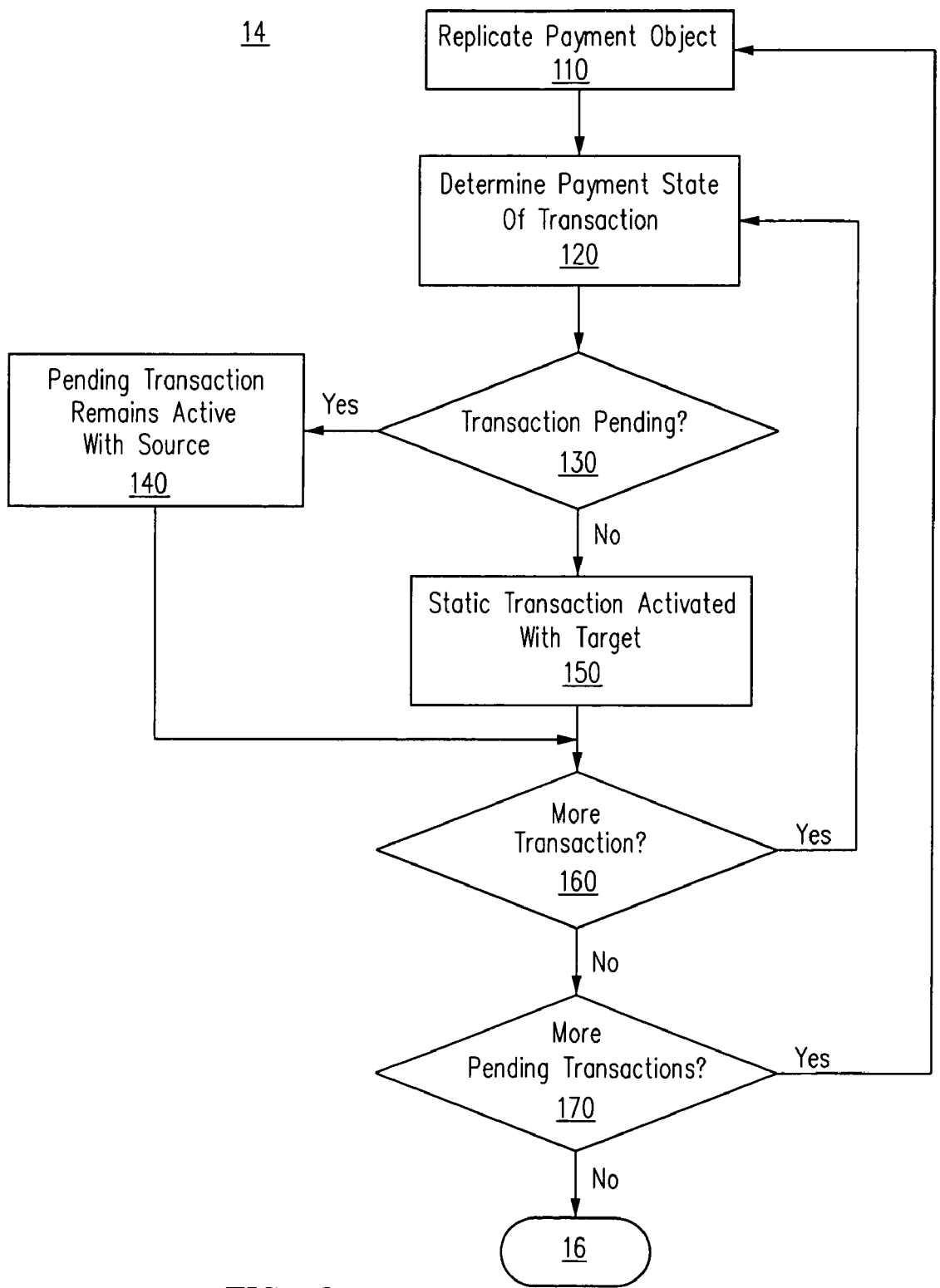
FIG. 2 is a flowchart illustrating a method for selectively migrating static transactions according to one embodiment of the present invention.

FIG. 2 is a flowchart illustrating a method 14 for selectively migrating static transactions according to one embodiment of the present invention. More specifically, a payment object is replicated 110 from the source (e.g., payment module or payment processor) to the target (e.g., payment module or payment processor). The payment object can include information about pending transactions. The payment object can also include the payment information used to set up future payments. For example, the target can take over the recurring mortgage payment amount of $1,302.55 to Bank of America, loan account number 6520-82287-3394, drawn from Wells Fargo, checking account number 12821-442343-232, on the 3rd day of each month on behalf of Lilian Burwell. The payment object can also include payment history of completed payments. An example payment history of completed payments can show that the $1,302.55 was paid on the 3rd day for each month since setting up the payment object, as evidenced by, for example, a transaction number received from Wells Fargo upon payment request, and a confirmation number received from Bank of America upon receipt of funds.

The payment state of a transaction associated with a payment object is determined 120. Example payment states include a future payment state, a pending payment state, and a completed payment state. In one embodiment, the payment state is explicit data. An appropriate data field or flag can be accessed and stored in the target. In another embodiment, the payment state is implied from the payment information, for example, by searching for a confirmation of receipt related to a payment request or by querying a payment processing system or payee. One embodiment of a state diagram used for implying a payment state is discussed below with respect to FIG. 5.

Migration of the transaction depends on whether the transaction is in a pending state 130. While data related to pending transactions can be partially migrated to the target, migration is not finished until confirmation information is migrated as well. The transaction remains 140 active with the source in the meantime. If the transaction is not pending at migration (e.g., the transaction is scheduled for a future date, or the transaction has been completed), the transaction can be completely migrated at the target 150, and the object is completely migrated. Referring to the above example, the $1,302.55 mortgage payment will now be made by the target on behalf of Lilian Burwell on the 3rd day of the month following migration.

Figure 3:
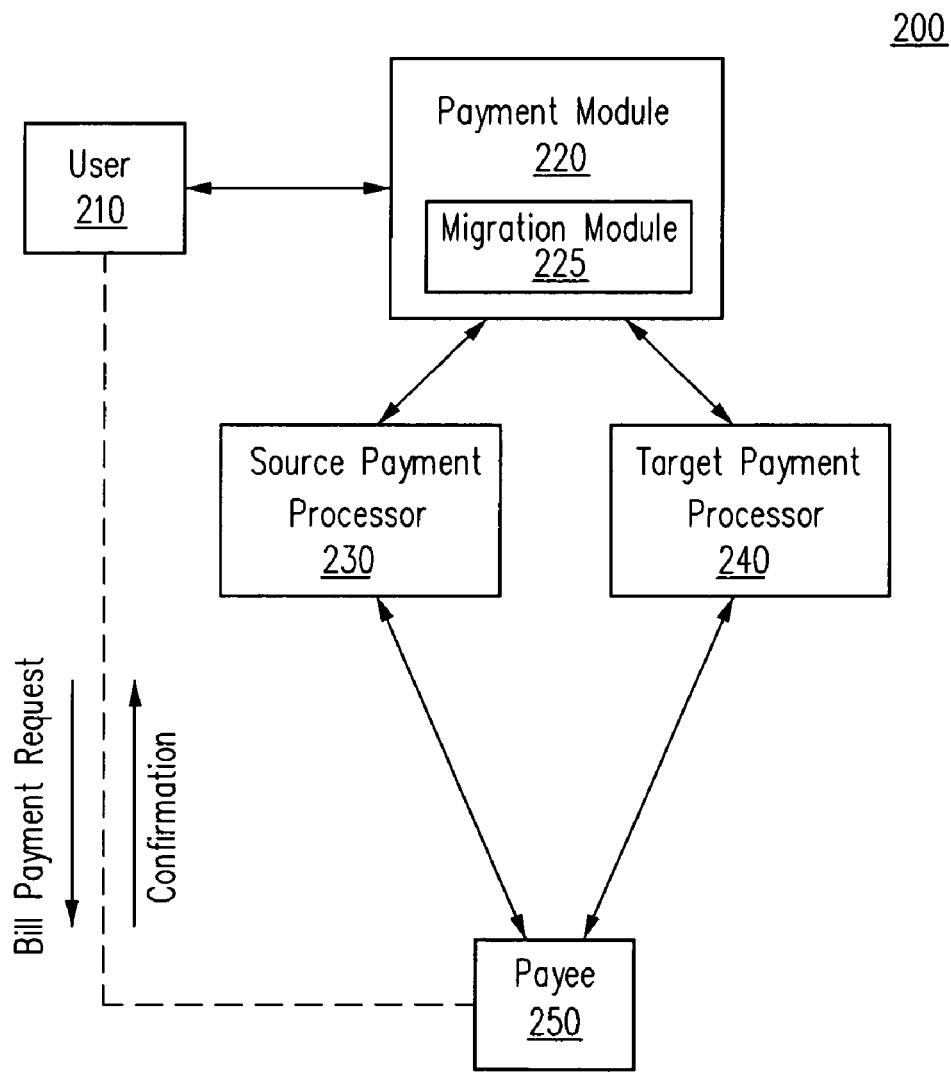
FIG. 3 is a block diagram illustrating a system for migrating transactions between payment processors according to one embodiment of the present invention.

FIG. 3 is a block diagram illustrating a system 200 for migrating payment objects according to one embodiment of the present invention. The system 200 comprises a payment module 220, a source payment processor 230, and a target payment processor 240. Generally, the system permits a user 210 to make bill payments to a payee 250.

The payment module 220 can be, for example, software executing on a personal computer or other device, software executing on a server and presented through a web client (e.g., online banking service), and the like. The payment module 220 provides a user interface for the user 210 to set up payment objects and can track transactions for the user 210.

The payment module 220 includes a migration module 225 which can be, for example, a plug-in, a downloaded software update, a separate application, and the like. The migration module 220 manages the migration process in part through a determination of transaction states. In one embodiment, the migration module 220 can track pending transactions and ensure consistency between the source and target payment processors 230, 240 upon completion of the pending transactions. More specifically, when first initiated, the migration module 220 processes the list of payment objects that have been setup by the user, and determines the state of each transaction as discussed above. For transactions that are not pending, the migration module 220 can initiate future transactions from the target and log completed payments into a history. For each pending transaction the migration module 220 tracks the state of the transaction in memory until completed as discussed above.

The source payment processor 230 can be, for example, software executing code on a server, such as operated by a payment processing system provider (e.g., CheckFree Corp. of Norcross, Ga. or Matavante Corp. of Milwaukee, Wis.). The source payment processor 230 handles transactions prior to a migration. The target payment processor 240 can also be server software, for example, operated by a different payment processing system provider. The target payment processor 240 handles transactions after migration. Both the source and target payment processors 230, 240 disburse funds to the payee 250, through either ACH transactions, electronic funds transfers, mailed checks, debit card or credit card charges or the like.

Figure 4:
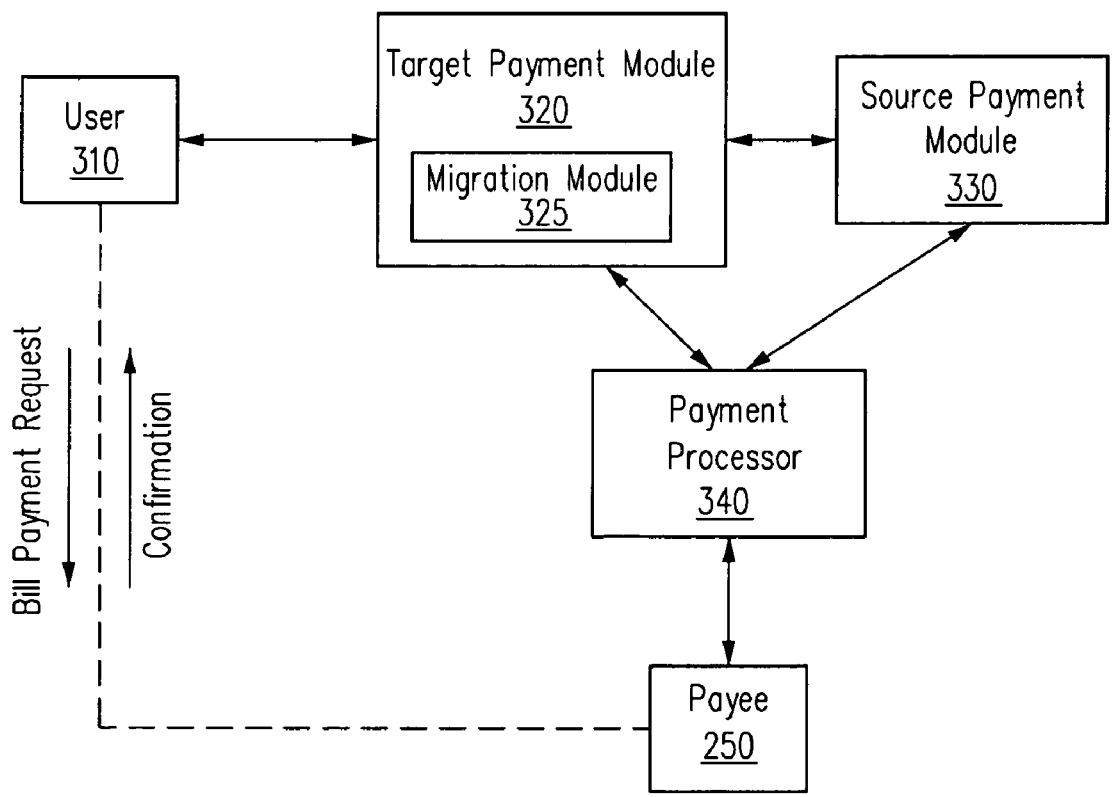
FIG. 4 is a block diagram illustrating a system for migrating transactions between payment modules according to one embodiment of the present invention.

FIG. 4 is a block diagram illustrating a system 300 for migrating bill payments between payment modules according to one embodiment of the present invention. The system 300 comprises a target payment module 320 and a source payment module 330, and a payment processor 340. In one embodiment, the target payment module 320 is a new version of a software product while the source payment module 330 is a past version of the same software product. The target payment module 320 includes a migration module 325 that queries the source payment module 330 to perform migration as described.

Figure 5:
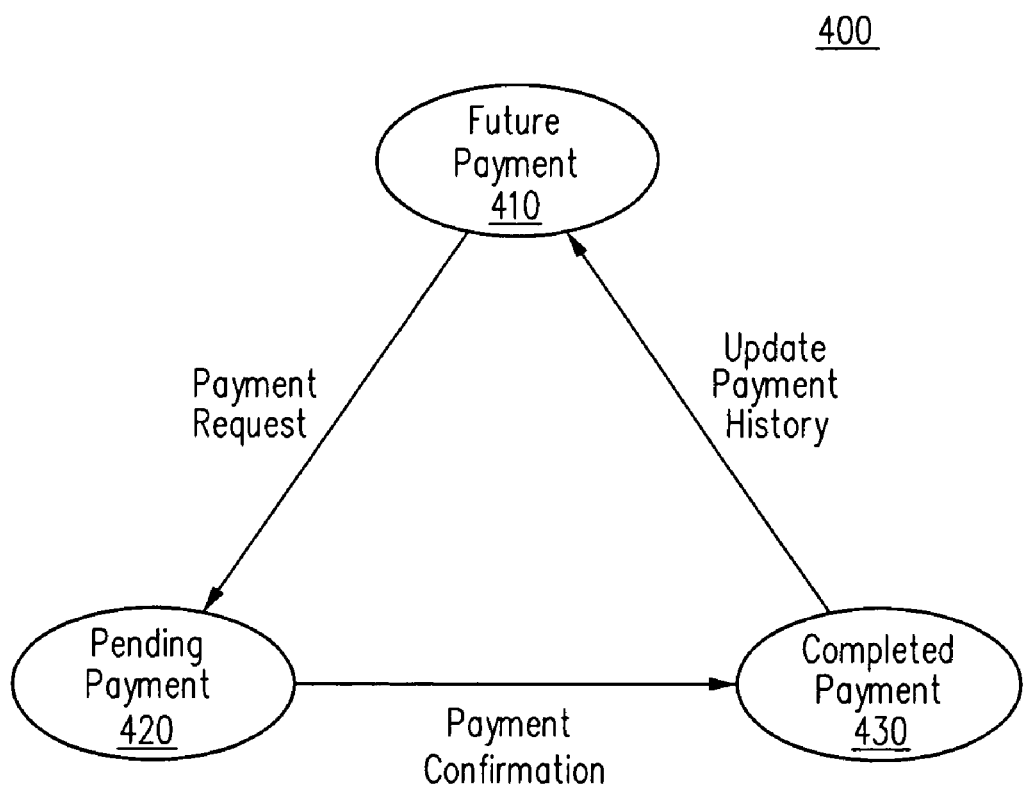
FIG. 5 is a state diagram for implying various payment states according to one embodiment of the present invention.

FIG. 5 is a state diagram 400 for implying various payment states according to one embodiment of the present invention. A payment state can be explicit or implicit and can be tracked by the migration module 225 or 325 as described above. When a user sets up a payment object, a transaction begins at a future payment state 410. The transaction remains in at this state until reaching a payment date (e.g., immediately or in the future) when the transaction begins processing.

Once payment is requested at a source (e.g., by the payment module 220 to the source payment processor 230), the transactions changes to a payment pending state 420. The transaction can be initiated by sending a payment request for processing that uses the payment information. The transaction can remain in this state for a few seconds or as long as a few months. During this period, the components of the electronic payment system, clear payments in batch to payees such as the payee 350. Note that in some embodiments the transaction can change to the pending state 420 during preparations and prior to actually being dispatched (e.g., four days prior to dispatch). The transaction is maintained at the source during this period.

Once payment is confirmed (e.g., by the source payment processor 230 to the payment module 220), the transaction changes to a completed payment state 430. Confirmation of payment, such as a confirmation number for the transaction, can be received responsive to an error free transfer of funds to the payee 350. At this point, the transaction can be logged into a history and replicated to a target. In the case of a payment object set up for recurring or multiple payments, a next transaction enters the future payment state 410 at the target.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A system for migrating electronic bill payments, including:

a computing system;

a computing system processor, the computing system processor implementing at least part of a process for migrating electronic bill payments; the process for migrating electronic bill payments comprising:

providing a payment module to store payment objects having payment information for a bill payment and to submit a transaction based on a payment object;

providing a source payment processor, in communication with the payment module, having at least one payment object representing a static payment and at least one payment object representing a pending payment, the source payment processor to manage the transaction and return a confirmation to the payment module; and providing a migration module, in communication with the source payment processor, to replicate the at least one payment object representing a static payment and the at least one payment object representing a pending payment from the source payment processor to a target payment processor, the migration module configured to determine a payment state of each transaction, and migrate data related to transactions having a static payment state to the target payment processor, and track a transaction having a pending payment state at the source payment processor, until the transaction reaches a completed payment state, and migrate data related to the transaction having a pending payment state to the target payment processor once confirmation is obtained that indicates the transaction is in a static payment state.

2. The system of claim 1, wherein the migration module assigns the pending payment state to the transaction responsive to being requested, but not yet confirmed.

3. The system of claim 1, wherein the migration module updates the transaction, at the target, responsive to reaching the completed payment state.

4. The system of claim 1, wherein the migration module assigns a completed payment state to an additional transaction that has been confirmed.

5. The system of claim 1, wherein the migration module assigns a future payment state to an additional transaction that has yet to be requested.

6. The system of claim 5, wherein the target payment processor requests the additional payment in accordance with the payment information.

7. The system of claim 1, wherein the migration module replicates each transaction and a corresponding state.

\* \* \* \* \*